(12) United States Patent
Bergman (10) Patent No.: US 11,336,614 B2
(45) Date of Patent: May 17, 2022

(54) CONTENT NODE NETWORK ADDRESS SELECTION FOR CONTENT DELIVERY

(71) Applicant: Fastly, Inc., San Francisco, CA (US)

(72) Inventor: Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 16/894,106

(22) Filed: Jun. 5, 2020

(65) Prior Publication Data
US 2020/0344199 A1    Oct. 29, 2020

Related U.S. Application Data

(63) Continuation of application No. 16/121,937, filed on Sep. 5, 2018, now Pat. No. 10,715,480, which is a
(Continued)

(51) Int. Cl.
| | |
|---|---|
| *H04L 61/4511* | (2022.01) |
| *H04L 67/568* | (2022.01) |
| *H04L 67/101* | (2022.01) |
| *H04L 43/0829* | (2022.01) |
| *H04L 43/0852* | (2022.01) |
| *H04L 43/0888* | (2022.01) |
| *H04L 43/10* | (2022.01) |

(52) U.S. Cl.
CPC ........ *H04L 61/1511* (2013.01); *H04L 67/101* (2013.01); *H04L 67/2842* (2013.01); *H04L 43/0829* (2013.01); *H04L 43/0852* (2013.01); *H04L 43/0888* (2013.01); *H04L 43/10* (2013.01)

(58) Field of Classification Search
CPC ............................ H04L 61/15–61/1511; H04L 67/1002–67/101; H04L 67/28–67/2842
See application file for complete search history.

(56) References Cited

U.S. PATENT DOCUMENTS

| | | | |
|---|---|---|---|
| 6,304,913 | B1 | 10/2001 | Rune |
| 6,484,143 | B1 | 11/2002 | Swildens et al. |
| (Continued) | | | |

FOREIGN PATENT DOCUMENTS

| | | |
|---|---|---|
| WO | 2012131287 A1 | 10/2012 |
| WO | 2012167106 A1 | 12/2012 |

OTHER PUBLICATIONS

Ingmar Poese et al., "Improving Content Delivery with PaDIS", IEEE, pp. 46-52 (Year: 2012).*

*Primary Examiner* — Clayton R Williams (57) ABSTRACT

Systems, methods, apparatuses, and software that select network addresses of a content node of a content delivery network are provided herein. In one example, a method of operating a control node to perform network address selection that selects between different communication service providers according to network characteristics is presented. The control node receives a domain name lookup request from an end user device to reach a content node. The control node processes network characteristics and the domain name lookup request to select a network address that corresponds to one of the communication service providers. The end user device can use the selected network address to reach the content node over the selected communication service provider.

20 Claims, 7 Drawing Sheets

Related U.S. Application Data continuation of application No. 14/483,358, filed on Sep. 11, 2014, now Pat. No. 10,097,503.

(60) Provisional application No. 61/883,866, filed on Sep. 27, 2013.

(56) References Cited

U.S. PATENT DOCUMENTS

| | | |
|---|---|---|
| 6,587,438 B1 | 7/2003 | Brendel |
| 6,665,702 B1 | 12/2003 | Zisapel et al. |
| 7,039,709 B1 * | 5/2006 | Beadle .................. H04L 45/12 709/203 |
| 7,080,138 B1 | 7/2006 | Baker et al. |
| 7,142,528 B2 | 11/2006 | Tanimoto et al. |
| 7,716,367 B1 | 5/2010 | Leighton et al. |
| 7,953,865 B1 | 5/2011 | Miller et al. |
| 8,145,788 B1 | 3/2012 | Love et al. |
| 8,427,958 B2 | 4/2013 | Ko et al. |
| 8,463,877 B1 | 6/2013 | Richardson et al. |
| 8,463,933 B2 | 6/2013 | Harrang et al. |
| 8,472,324 B1 | 6/2013 | Richardson et al. |
| 8,489,731 B2 | 7/2013 | Gagliardi et al. |
| 8,688,681 B1 | 4/2014 | Xiao et al. |
| 8,745,177 B1 | 6/2014 | Kazerani et al. |
| 8,756,341 B1 | 6/2014 | Richardson et al. |
| 9,036,504 B1 | 5/2015 | Miller et al. |
| 9,075,660 B2 | 7/2015 | Guo et al. |
| 10,021,019 B2 | 7/2018 | Koponen et al. |
| 2002/0029275 A1 | 3/2002 | Selgas et al. |
| 2002/0038360 A1 | 3/2002 | Andrews et al. |
| 2002/0087722 A1 * | 7/2002 | Datta ................ H04L 29/12801 709/239 |
| 2002/0163882 A1 * | 11/2002 | Bornstein ............... H04L 29/06 370/227 |
| 2003/0005152 A1 | 1/2003 | Diwan et al. |
| 2003/0039212 A1 | 2/2003 | Lloyd |
| 2003/0065763 A1 | 4/2003 | Swildens et al. |
| 2003/0101278 A1 * | 5/2003 | Garcia-Luna-Aceves ................... H04L 43/0805 709/240 |
| 2004/0249971 A1 | 12/2004 | Klinker |
| 2005/0076104 A1 | 4/2005 | Liskov et al. |
| 2006/0187820 A1 | 8/2006 | French |
| 2006/0271655 A1 | 11/2006 | Yoon et al. |
| 2007/0050522 A1 | 3/2007 | Grove et al. |
| 2007/0169149 A1 | 7/2007 | Jennings et al. |
| 2008/0056207 A1 | 3/2008 | Erikson et al. |
| 2008/0186202 A1 | 8/2008 | Vaswani et al. |
| 2009/0019143 A1 | 1/2009 | Frutiger |
| 2009/0172192 A1 | 7/2009 | Christian et al. |
| 2009/0248786 A1 | 10/2009 | Richardson et al. |
| 2009/0287968 A1 | 11/2009 | Lee et al. |
| 2010/0125673 A1 | 5/2010 | Richardson et al. |
| 2010/0125675 A1 | 5/2010 | Richardson et al. |
| 2010/0161760 A1 * | 6/2010 | Maloo ................ H04L 61/1511 709/219 |
| 2010/0226372 A1 | 9/2010 | Watanabe |
| 2011/0055312 A1 | 3/2011 | Purdy, Sr. |
| 2011/0066607 A1 | 3/2011 | Wong |
| 2011/0082931 A1 | 4/2011 | Wang et al. |
| 2011/0131290 A1 | 6/2011 | Kim et al. |
| 2011/0173339 A1 | 7/2011 | Zhang |
| 2011/0295942 A1 | 12/2011 | Raghunath et al. |
| 2012/0054265 A1 | 3/2012 | Kazerani et al. |
| 2012/0079115 A1 | 3/2012 | Richardson et al. |
| 2012/0110148 A1 | 5/2012 | Liu et al. |
| 2012/0265900 A1 | 10/2012 | Richardson et al. |
| 2012/0290693 A1 | 11/2012 | Karasaridis et al. |
| 2013/0013764 A1 | 1/2013 | Li et al. |
| 2013/0212266 A1 | 8/2013 | Lyon |
| 2014/0047109 A1 | 2/2014 | Santoro et al. |
| 2014/0089503 A1 | 3/2014 | Thyni et al. |
| 2014/0108672 A1 | 4/2014 | Ou et al. |
| 2014/0143438 A1 | 5/2014 | Kagan et al. |
| 2014/0149552 A1 | 5/2014 | Carney et al. |
| 2014/0149601 A1 | 5/2014 | Carney et al. |
| 2014/0164584 A1 | 6/2014 | Joe et al. |
| 2014/0207818 A1 | 7/2014 | Jellick et al. |
| 2014/0258450 A1 | 9/2014 | Suryanarayanan et al. |
| 2014/0280963 A1 | 9/2014 | Burbridge et al. |
| 2014/0289303 A1 | 9/2014 | Tarricone et al. |
| 2014/0289420 A1 | 9/2014 | Tarricone et al. |
| 2014/0344331 A1 | 11/2014 | Johns et al. |
| 2015/0033265 A1 | 1/2015 | Howard |
| 2015/0067113 A1 | 3/2015 | Dankwardt et al. |
| 2015/0195204 A1 | 7/2015 | Haramaty et al. |
| 2015/0249600 A1 | 9/2015 | Numata |
| 2015/0382055 A1 | 12/2015 | Dua |
| 2017/0013321 A1 | 1/2017 | Murphy |
| 2017/0163755 A1 | 6/2017 | Slocombe et al. |

* cited by examiner

CONTENT NODE NETWORK ADDRESS SELECTION FOR CONTENT DELIVERY

RELATED APPLICATIONS

This application hereby claims the priority to U.S. patent application Ser. No. 16/121,937, filed Sep. 5, 2018 which claims priority to U.S. patent application Ser. No. 14/483,358, filed Sep. 11, 2014, and claims the benefit of and priority to U.S. Provisional Application No. 61/883,866, filed Sep. 27, 2013, all of which are hereby incorporated by reference in their entirety.

TECHNICAL FIELD

Aspects of the disclosure are related to the field of packet communication networks, and in particular, delivery of content over packet communication networks.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between the origin servers of the content providers and the end users. The content delivery systems typically have one or more content nodes distributed across a large geographic region to provide faster and lower latency access to the content for the end users. When end users request content, such as a web page, which is handled through a content node, the content node is configured to respond to the end user requests instead of the origin servers. In this manner, a content node can act as a cache for the origin servers. However, when a content node communicates over different communication service providers, such as Internet Service Providers (ISPs), the various ISPs and other packet networks over which end user content requests and content delivery are handled can add additional slowdowns and latency.

OVERVIEW

Systems, methods, and software that select network addresses of a content node are provided herein. In one example, a method of network address selection that selects between different communication service providers according to network characteristics is presented. In some examples, the selection of network addresses is performed during a domain name translation process. Also in this example, one or more non-transitory computer readable media having stored thereon program instructions executable by one or more data storage systems of a content node is presented. When executed by the one or more data storage systems, the program instructions can select network addresses according to network characteristics.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Network content, such as web page content, typically includes content such as text, hypertext markup language (HTML) pages, pictures, video, audio, code, scripts, or other content viewable by an end user in a browser or other application. This various network content can be cached by the nodes of a content delivery network. The network content includes example website content referenced in FIG. 1, such as "www.gamma.gov," "www.alpha.com," and "www.beta.net," among others. When a content delivery network is employed, the content delivery network can act as a proxy to cache content delivery between origin servers and the end user devices.

The content delivery networks typically have one or more content nodes distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures.

Figure 1:
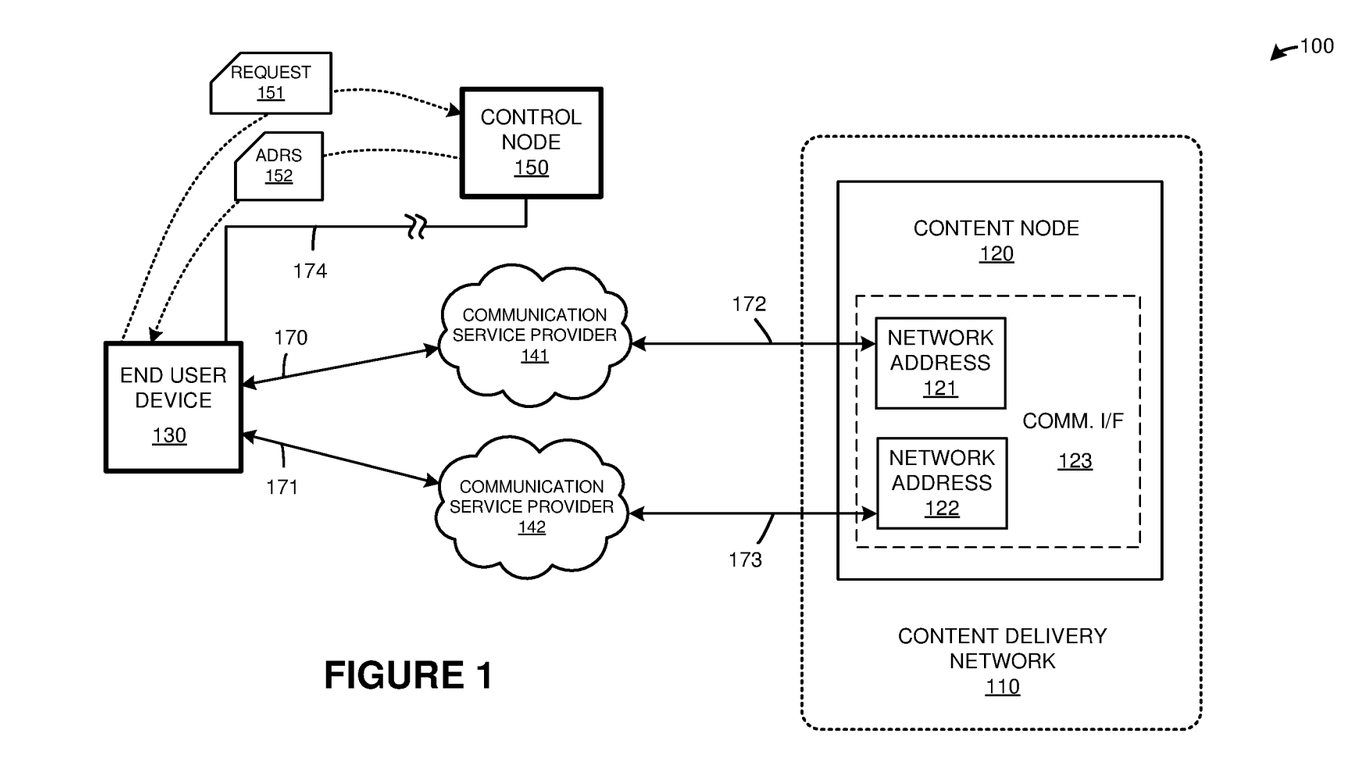
FIG. 1 is a system diagram illustrating a communication system.

As a first example employing a content delivery network, FIG. 1 is presented. FIG. 1 is a system diagram illustrating communication system 100. Communication system 100 includes content delivery network 110, packet switched networks 105, control node 150 and at least one end user device 130. Content delivery network (CDN) 110 includes one or more content nodes, such as content node (CN) 120.

End user device 130 is representative of an end user device which can request and receive network content, and any number of end user devices 130 can make content requests to the one or more content nodes, such as content node 120. Content node 120 communicates to end user device 130 over network links 170-173 that communicate with communication service providers 141 and 142. In some examples, content node 120 comprises a cache node.

To further illustrate FIG. 1, a brief description of the operation of communication system 100 is included. In operation, control node 150 can perform domain name translation for end user devices, such as a domain name translation service (DNS). This domain name translation can translate a domain name or other alphanumeric network identifier for content into a network address. Control node 150 identifies network characteristics for end user device 130 and communication service providers 141 and 142. When end user device 130 attempts to retrieve content, end user device 130 can issue lookup request 151 to control node 150 over at least network link 174. Control node 150 processes the network characteristics and lookup request 151 to select a network address with which end user device 130 reaches cached content on content node 120 or some other content node.

Communication interface 123 of content node 120 communicates using at least network addresses 121 and 122. In this example, content node 120 has multiple network addresses 121 and 122, control node 150 can select either network address 121 or network address 122 when processing lookup request 151 to select a network address for retrieving content from content node 120. Although network addresses 121 and 122 can identify the same content node 120, a content request destined for network address 121 is transferred over a different communication service provider than a content request destined for network address 122. Control node 150 identifies and processes at least the network characteristics of communications service providers 141 and 142 to select either of network addresses 121 and 122. This selection can depend on which communication service provider currently has more desirable network characteristics, among other considerations. After selecting a network address responsive to lookup request 151, control node 150 transfers 152 the selected network address for receipt by end user device 130.

After end user device 130 receives the selected network address, device 130 issues a content request using the network address. The content request is issued for delivery to content node 120 over any of communication service providers 141-142 that is associated with the network address. For example, network address 121 is routed over communication service provider 141, while network address 122 is routed over communication service provider 142. Content node 120 then receives the content request over the selected communication service provider associated with the selected network address. Responsive to the content request, content node 120 delivers content requested by end user device 130. For example, if the content requested is associated with www.alpha.com, then content node 120 responsively transfers the content for www.alpha.com for delivery to end user device 130. The content can be delivered over any of communication service providers 141 or 142.

Figure 2:
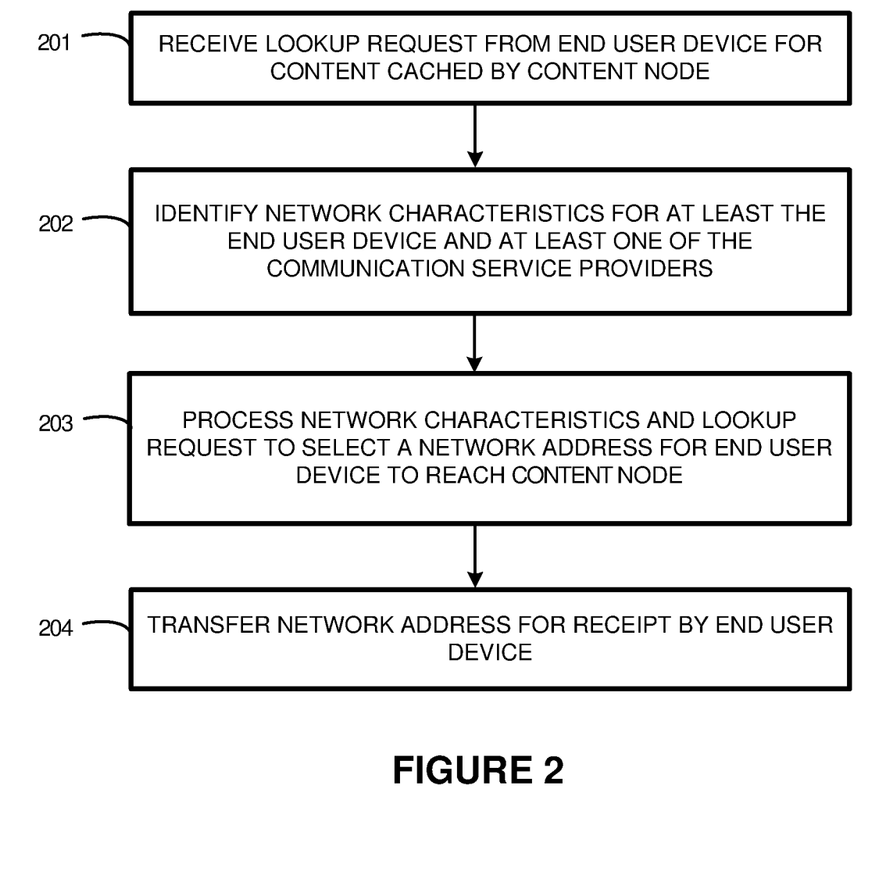
FIG. 2 is a flow diagram illustrating a method of operating a control node.

FIG. 2 is a flow diagram illustrating a method of operating control node 150. Control node 150 receives (201) lookup request 151 from end user device 130 for content cached by content node 120. Lookup request 151 includes at least the domain name of a content site. Based on lookup request 151, control node 150 determines that the requested domain name is for a content site with content cached by content node 120. Control node 150 can be configured with information about the network topology of communication system 100, and control node 150 can be aware that network addresses 121-122 reach content node 120. Control node 150 can also be aware that network addresses 121-122 routes through communication service providers 141-142, respectively.

Control node 150 identifies (202) network characteristics for at least end user device 130 and communication service providers 141-142. The network characteristics can include characteristics, such as performance data, collected previously or received by control node 150. The network characteristics can include real-time metrics of current network conditions, and can include past performance metrics. For example, network conditions can be such that communication service provider 141 can deliver content to end user device 130 with a higher throughput or lower latency than communication service provider 142. Such network conditions are reflected in the network characteristics that control node 150 identifies.

Control node 150 processes (203) the network characteristics and lookup request 151 to select a network address for end user device 130 to reach content node 120. The selected network address corresponds to one of communication service providers 141-142. Control node 150 transfers (204) the selected network address for delivery to user device 130, as indicated by message 152. End user device 130 can then issue content requests to that network address. Any of end user device 130, communication service providers 141-142, and content node 120 can report to control node 150 about network performance information. This network performance information can include performance information for the present content request or a response that occurs when end user device 130 uses the selected network address.

Referring back to the elements of FIG. 1, end user device 130 can be a user device, subscriber equipment, customer equipment, access terminal, smartphone, personal digital assistant (PDA), computer, tablet computing device, e-book, Internet appliance, media player, game console, or some other user communication apparatus, including combinations thereof. Content node 120, communication service providers 141-142, and control node 150 can each include communication interfaces, network interfaces, processing systems, computer systems, microprocessors, storage systems, storage media, or some other processing devices or software systems, and can be distributed among multiple devices. Examples of content node 120, communication service providers 141-142, and control node 150 can each include software such as an operating system, logs, databases, utilities, drivers, caching software, networking software, and other software stored on a computer-readable medium. Content delivery network 110, in addition to including content node 120, can include equipment and links to route communications between content node 120, communication service providers 141-142, and control node 150, among other operations.

Communication links 170-174 each use metal, glass, optical, air, space, or some other material as the transport media. Communication links 170-174 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-174 can each be a direct link or can include intermediate networks, systems, or devices, and can include a logical network link transported over multiple physical links. Although one main link for each of links 170-174 is shown in FIG. 1, it should be understood that links 170-174 are merely illustrative to show communication modes or access pathways. In other examples, further links can be shown, with portions of the further links shared and used for different communication sessions or different content types, among other configurations. Communication links 170-174 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
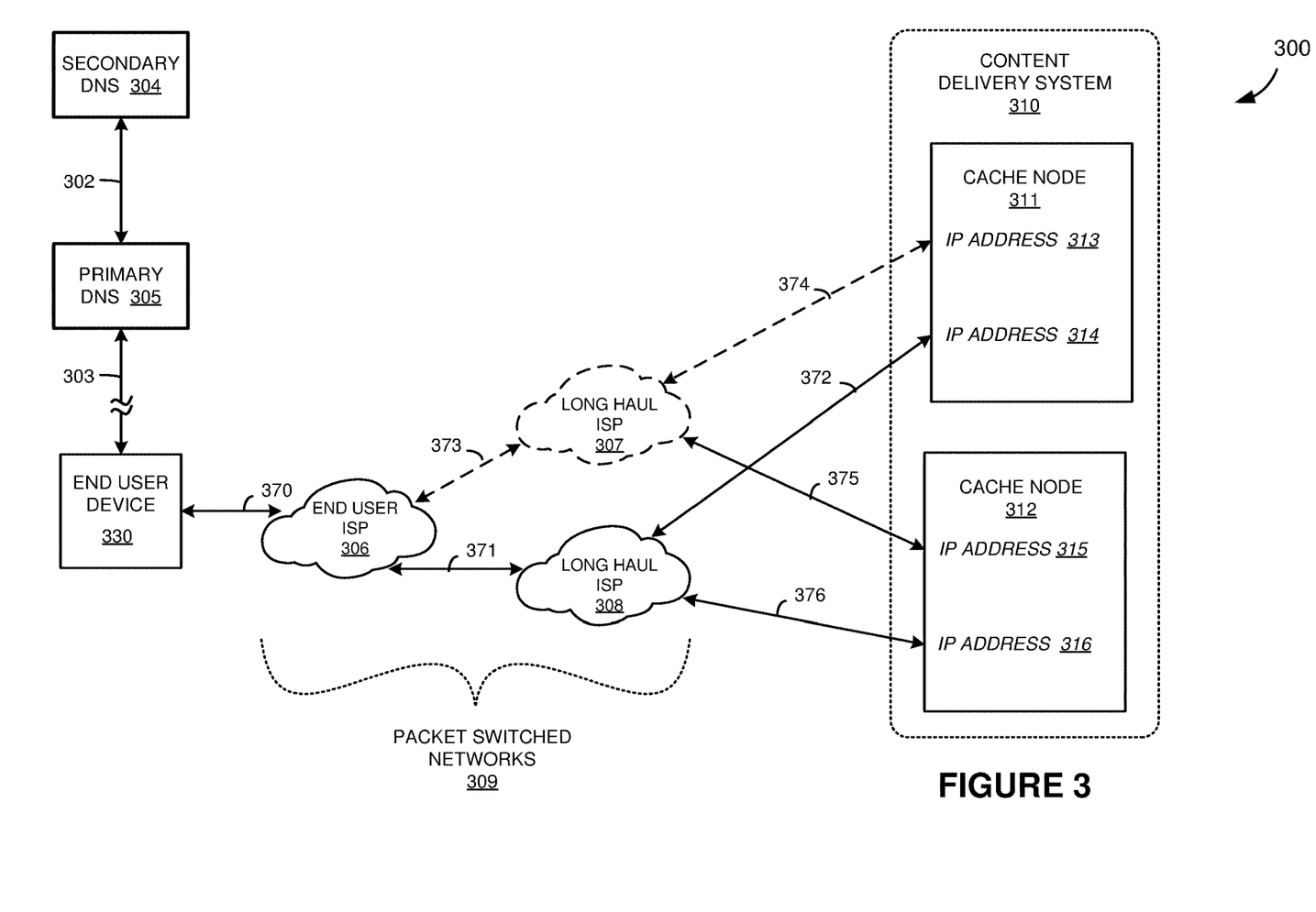
FIG. 3 is a system diagram illustrating a communication system.

FIG. 3 is a system diagram illustrating communication system 300. Communication system 300 includes domain name servers (DNS) 304-305, end user device 330, packet switched networks 309 and content delivery network 310. Elements of packet switched networks 309 are configured such that a content request from end user device 330 is routed through end user internet service provider (ISP) 306 and a selected one of long haul ISP 307 or 308. A DNS architecture in this example includes DNS 304 and 305. Primary DNS 305 receives lookup requests over network link 303 transferred by end user device 330. If the lookup request is for a domain name or network location at which cached content resides, then primary DNS 305 delegates the lookup request by forwarding the request over network link 302 to secondary DNS 304.

In this example, the network addresses are Internet protocol (IP) addresses. Content that is cached on cache node 311 and cache node 312 is reachable by associated IP addresses 313-316. Secondary DNS 304 processes a lookup request received from primary DNS 305 along with at least network characteristics of end user device 330 and the three ISPs 306-308 when selecting an IP address. Since a content request passes through two ISPs, secondary DNS 304 can select an IP address according to the network characteristics of any pairing of ISPs, among other selections.

Content requests arrive at cache node 311 over either of link 374 or 372 depending on which long haul ISP 307 or 308 routes the selected IP address. When selecting IP addresses that are associated with cache node 311, secondary DNS 304 can process network or communication status data such as latency, throughput, outages, price schedules, and network performance issues with causes such as buffer saturation, packet window not tuned, page swap, disk wait, packet loss, bottleneck, and congestion. While processing secondary DNS 304 can consider performance constraints of network links 370-376, perhaps including latency measured with Internet control message protocol (ICMP) pings or with actual delivery time data for content-related traffic as measured by end user device 330, other end user devices not pictured in FIG. 3, or cache node 311, among other monitoring systems or devices. End user device 330 properties can also be processed by secondary DNS 304. For example the IP address of an end user device can be associated with a range of IP addresses that are showing poor performance such as latency higher than a latency threshold. The latency discussed herein can include latency for a request for content issued to a selected content node and the delivery of that content to an end user device.

Secondary DNS 304 can receive and process communication status data in real time to control dynamic routing decisions by selecting network addresses that are provided responsive to DNS lookup requests. For example, long haul ISPs 307 and 308 might usually share equally the traffic of content requests going to cache node 311. By repeatedly applying its IP-address selection criteria to the most recent communication status data, secondary DNS 304 can tune the routing of content to better fit current conditions.

In this example, end user device 330 attempts to retrieve content that is stored at cache node 311. Secondary DNS 304 selects IP address 313 and tells end user device 330 to use IP address 313 to reach cache node 311. Content requests directed to IP address 313 go through long haul ISP 307 in this example. If long haul ISP 307 begins to show signs of operational stress, including failures to meet quality thresholds, secondary DNS 304 can discontinue telling end user devices that cache node 311 is reachable at IP address 313 and instead instruct end user devices to reach content at an alternate IP address. FIG. 3 indicates the degraded service with dashed lines for long haul ISP 307, network links 373 and 374, and IP address 313. According to network characteristics, secondary DNS 304 can respond to subsequent lookup requests by selecting other cache node addresses than IP address 313, such as IP addresses 314-316. By selecting among IP addresses and associated routing dynamically, selection of IP address by secondary DNS 304 can shape traffic in real time according to performance, cost, and quality constraints, among other considerations.

Figure 4:
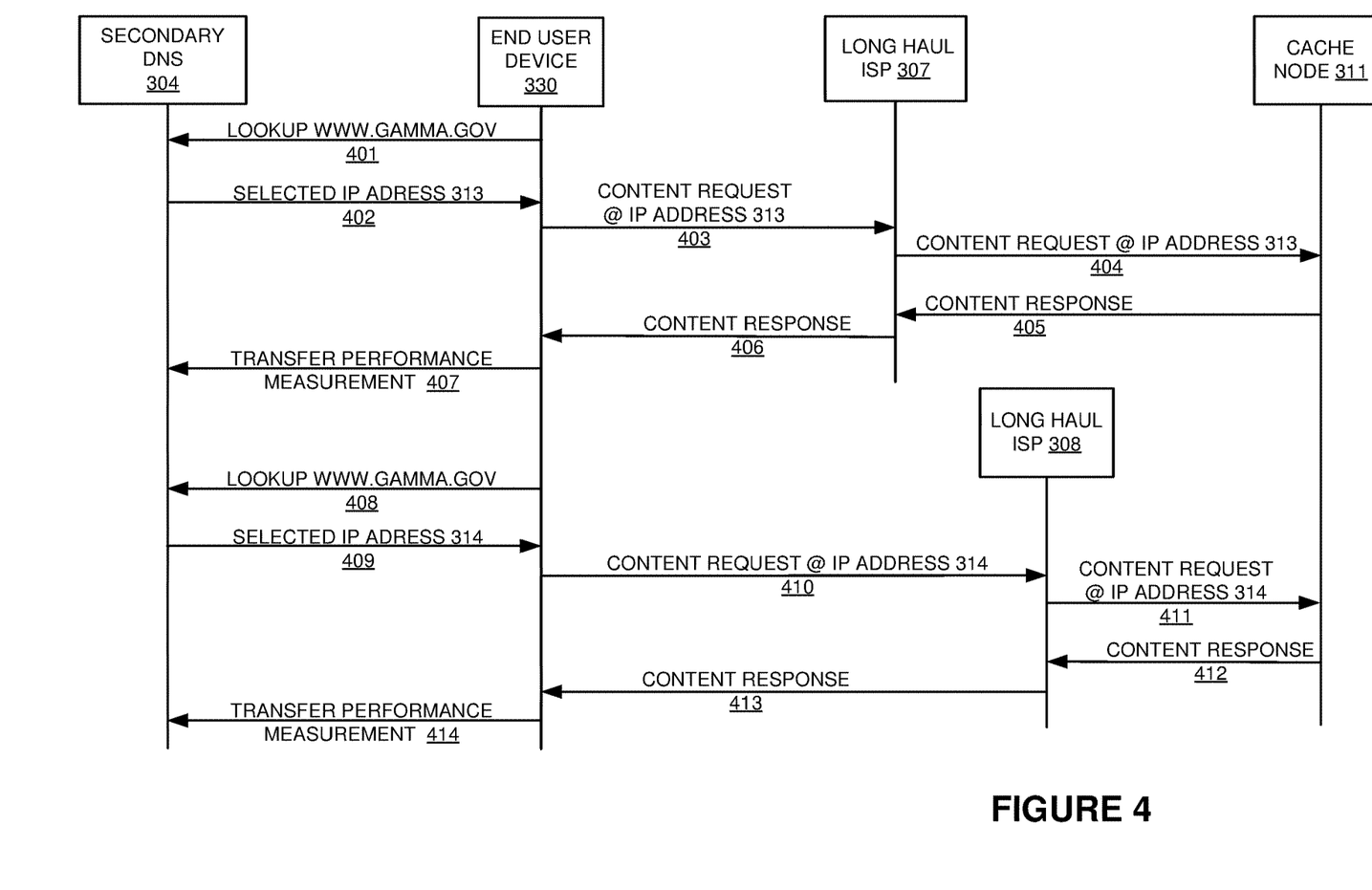
FIG. 4 is a sequence diagram illustrating an example method of operating a communication system.

FIG. 4 is a sequence diagram illustrating a method of operating FIG. 3. It should be understood that he operations of FIG. 4 can also be applied to similar elements of FIG. 1. Elements shown in FIG. 4 operate to select and use network addresses in communication system 300. Communication system 100 of FIG. 1 can also perform the behavior shown in FIG. 4, although variations are possible.

During operation, end user device 330 attempts to retrieve content, such as in a browser application or other end user application. The content can be presented to end user device 330 using a domain name, such as www.alpha.com, and user device 330 first must translate the domain name into a network address, such as an IP address, along with directory or path information. To translate the domain name, end user device 330 issues a domain name lookup request, which in this example is received by primary DNS 305. Although link 303 is shown in FIG. 3, it should be understood that the domain name lookup request can be transported over any number of network links or packet networks, including the Internet.

End use device 330 attempts to request content by first delivering (401) a lookup request of a site domain to DNS 305. DNS 305 determines that the domain name requested is associated with a secondary DNS system, and DNS 305 forwards the lookup request to secondary DNS 304. According to the network characteristics of end user device 330 and the various communication service providers available, secondary DNS 304 determines which communication service provider is currently desirable and selects an IP address that will reach cache node 311 through that communication service provider. In a first example, long haul ISP 307 currently has network characteristics that indicate higher performance than the network characteristics of long haul ISP 308. Because of these network characteristics, secondary DNS 304 selects an IP address that involves long haul ISP 307. To reach content on cache node 311 through long haul ISP 307, IP address 313 is selected. Secondary DNS 304 communicates (402) IP address 313 back to end user device 330.

When end user device 330 requests (403) the cached content, end user device 330 does so using selected IP address 313 to ensure that the content request reaches cache node 311 through (404) long haul ISP 307. Cache node 311 receives the content request at IP address 313, processes the content request, and replies (405, 406) with the desired cached content. Any network performance measurements made by end user device 330 for this retrieval of cached content are transferred (407) back to secondary DNS 304. Cache node 311 can also report network performance measurements to secondary DNS 304. End user device 330 can reuse the IP address selected by secondary DNS 304 by issuing multiple content requests to that IP address. End user device 330 can subsequently make another domain name lookup request to obtain another selected IP address based on more recent network characteristics.

At a later time, long haul ISP 307 experiences performance degradation, and end user device 330 prepares to retrieve more cached content. Secondary DNS 304 receives (408) another lookup request from end user device 330. According to network performance characteristics, secondary DNS decides to route content retrieval through long haul ISP 308 instead of long haul ISP 307. As such secondary DNS 304 selects IP address 314 of the same cache node 311. Secondary DNS 304 transfers (409) the selected IP address 314 to end user device 330. End user device 330 uses selected IP address 314 to request and receive cached content through long haul ISP 308 (410-413). Again, end user device 330 can report (414) performance measurements to secondary DNS 304. Cache node 311 can also report network performance measurements to secondary DNS 304.

The performance information or performance characteristics can be identified or determined in different ways. In some examples, secondary DNS 304 receives performance information transferred by various network devices, such as content nodes and end user devices that indicate performance of content requests and content delivery responsive to those content requests. In further examples, dedicated monitoring equipment is employed, such as management systems or monitoring systems, that monitor performance of various communication service providers associated with the various content nodes. As current performance conditions change, then different network addresses can be provided responsive to domain name lookup requests to route traffic over different communication service providers.

In yet further examples, performance associated with content requests of other end user devices is monitored and processed to make network address selections. For example, a second end user device can issue a content request to a network address, and performance of the request and subsequent content delivery via that network address and communication service provider can be monitored. The second user device can provide this performance information to DNS 304, or the content node involved in delivery the requested content can deliver the performance information to DNS 304. Instead of DNS 304 receiving the performance information, a different monitoring system can receive this performance information and provide it to DNS 304 periodically.

As discussed herein, the performance information can include latency information and transfer throughput information. The latency information can be related to a latency of a content request being fulfilled and having content transferred to an end user. The latency information can also relate to the delay between an end user device issuing a content request and that content request getting accepted by a content node. The throughput information can relate to data transfer throughput, bandwidth, or other data transfer characteristics related to a volume of content transferred to one or more end user devices. For example, a specific communication service provider can be monitored by a content node or other monitoring system to determine a volume of content that is presently being handled by the communication service provider. When the volume of content falls below a threshold level, then another communication service provider can be selected to handle content requests or content delivery.

Address ranges of various end user devices can be monitored as well. Network performance associated with a range of network addresses that correspond to end user devices can be monitored. When a particular address range, such as that associated with a particular ISP or long-haul provider, shows signs of poor performance, then that particular ISP or long-haul provider can be avoided. When a subsequent domain name lookup request is received from an end user device that falls within that address range is received, an alternate network address can be returned which routes any associated content requests over a different ISP or long-haul provider. For example, the second end user device mentioned above can be associated with a particular end user address range that is currently experiencing degraded performance. A subsequent domain name lookup request from another end user device can provide an alternate network address for a content node than that provided prior to the degraded performance.

Figure 5:
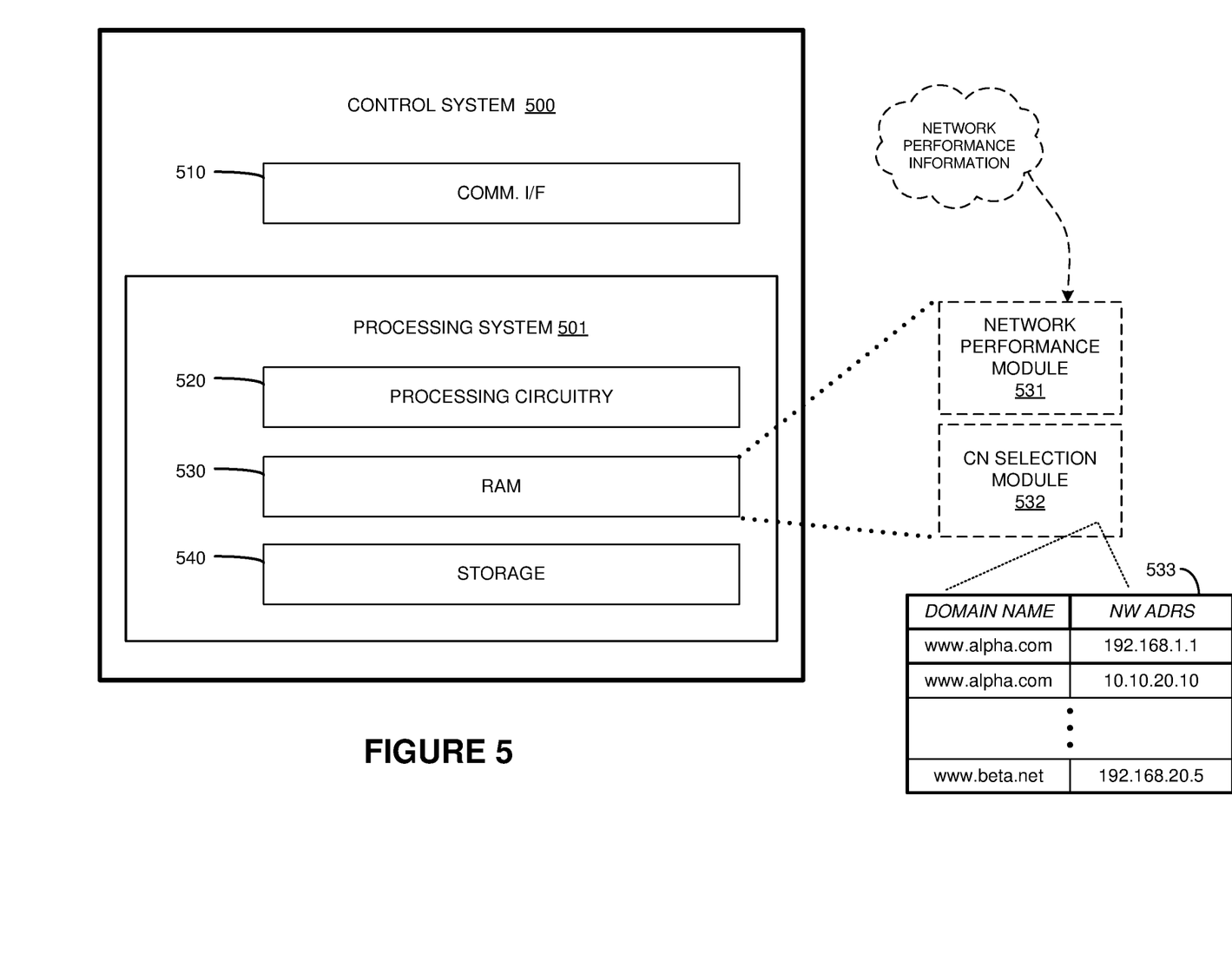
FIG. 5 is a block diagram illustrating an internal configuration of a control system.

FIG. 5 illustrates the internal configuration of control system 500. Control system 500 can be an implementation of control node 150 in FIG. 1 and secondary DNS 304 in FIG. 3, although control node 150 and secondary DNS 304 can have different internal configurations. Control system 500 comprises communication interface 510, and processing system 501. Processing system 501 includes processing circuitry 520, RAM 530, and storage 540. Processing system 501 is linked to communication interface 510. Processing system 501 includes processing circuitry 520 which is connected to RAM 530 that stores operating software. Control system 500 can include other components such as an enclosure that are not shown for clarity.

Processing system 501 can be implemented within a single processing device but can also be distributed across multiple processing devices or sub-systems that cooperate in executing program instructions. Examples of processing system 501 include general purpose central processing units, microprocessors, application specific processors, and logic devices, as well as any other type of processing device. In some examples, processing system 501 includes physically distributed processing devices, such as cloud computing systems.

Communication interface 510 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 510 include network interface card equipment, transceivers, modems, and other communication circuitry. In some examples, communication interface 510 receives domain name lookup requests issued by end user devices and transfers network addresses associated with content delivery nodes for receipt by end user devices responsive to domain name lookup requests.

RAM 530 and storage 540 can each comprise any non-transitory storage media readable by processing system 501 and capable of storing software. RAM 530 can include volatile and nonvolatile, removable and non-removable media implemented in any method or technology for storage of information, such as computer readable instructions, data structures, program modules, or other data. Storage 540 can include non-volatile storage media, such as solid state storage media, flash memory, or solid state storage system. RAM 530 and storage 540 can each be implemented as a single storage device but can also be implemented across multiple storage devices or sub-systems. RAM 530 and storage 540 can each comprise additional elements, such as controllers, capable of communicating with processing system 501.

Software stored on or in RAM 530 or storage 540 can comprise computer program instructions, firmware, or some other form of machine-readable processing instructions having processes that when executed by processing system 501 direct control system 500 to receive domain name lookup requests from end user devices for cached content, identify network characteristics of end user devices and communication service providers, process network characteristics and domain name lookup requests to select network addresses corresponding to communication service providers for end user devices to reach cache nodes, and transfer network addresses to end user devices, among other operations. The software of control system 500 can also include user software applications. The software can be implemented as a single application or as multiple applications. In general, the software can, when loaded into processing system 501 and executed, transform processing system 501 from a general-purpose device into a special-purpose device customized as described herein.

In one example, RAM 530 or storage 540 stores executable instructions for modules 531-532 as shown, although other implementations can use different modules. Network performance module 531 identifies network characteristics of at least end user devices and communication service providers. Content node (CN) selection module 532 processes the network characteristics and domain name lookup requests to select network addresses of cache nodes. CN selection module 532 can include various data structures, such as databases or lookup tables, that relate network addresses for content nodes to domain names or other information. For example, lookup table 533 is included in FIG. 5. CN selection module 532 can reference lookup table 533 to determine which network addresses relate to which domain names. As seen in lookup table 533, two network addresses are indicated for www.alpha.com, namely IP addresses 192.168.1.1 and 10.10.20.10. CN selection module 532 can select among these IP addresses based on at least the network performance information and characteristics discussed herein.

Figure 6:
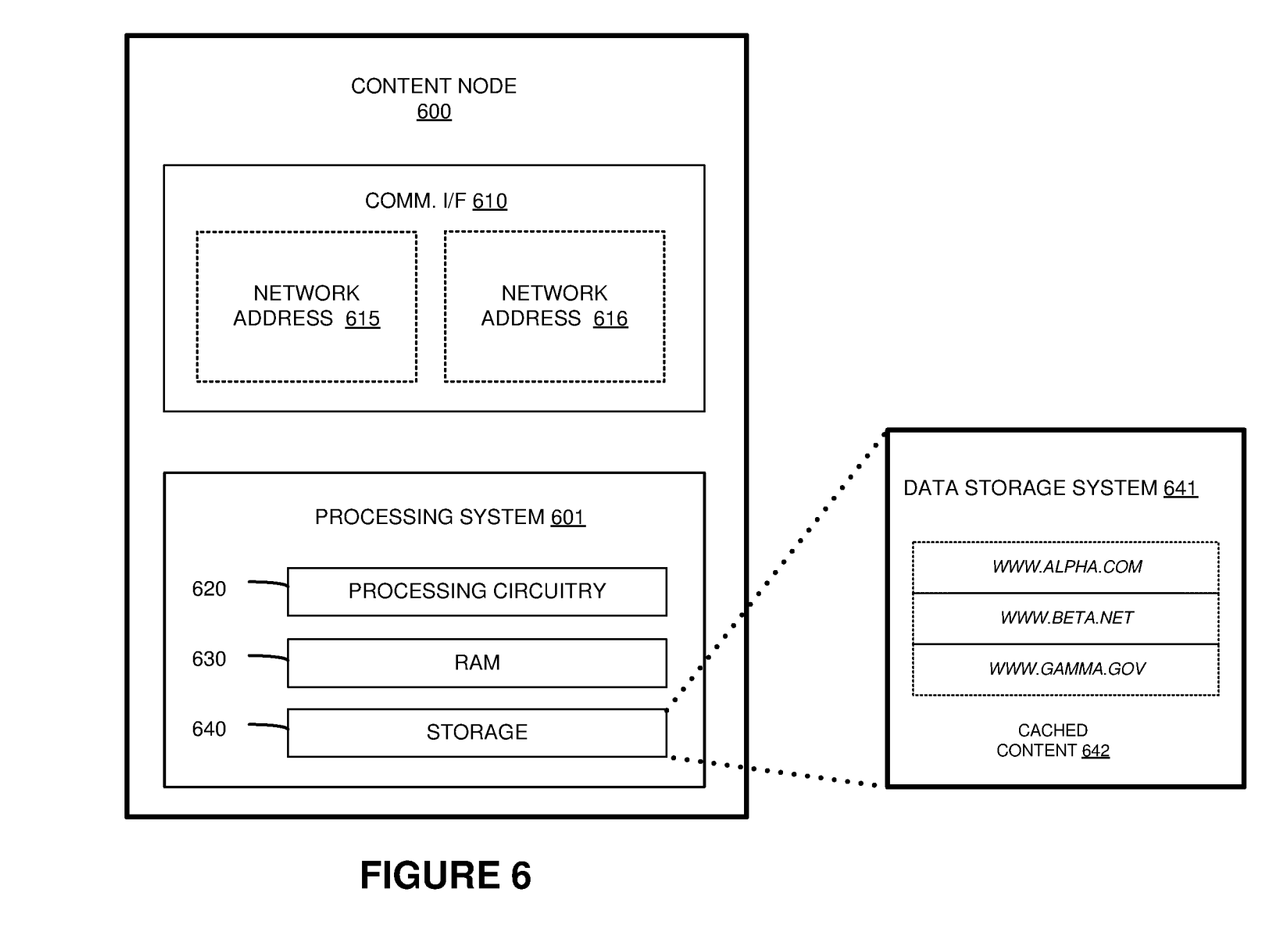
FIG. 6 is a block diagram illustrating an internal configuration of a content node.

FIG. 6 illustrates the internal configuration of content node 600. Content node 600 can be an implementation of content node 120 in FIG. 1, or cache nodes 311 and 312 in FIG. 3. Content node 120 and cache nodes 311 and 312 can have different internal configurations. Content node 600 includes communication interface 610, and processing system 601. Processing system 601 includes processing circuitry 620, RAM 630, and storage 640. In operation, processing system 601 is operatively linked to communication interface 610, RAM 630, and storage 640 by processing circuitry 620. Processing system 601 is capable of executing software stored in RAM 630 or storage 640. When executing the software, processing system 601 drives content node 600 to operate as described herein. Content node 600 can also include other elements, such as user interfaces, computer systems, databases, distributed storage and processing elements, and the like.

Processing system 601 can be implemented within a single processing device but can also be distributed across multiple processing devices or sub-systems that cooperate in executing program instructions. Examples of processing system 601 include general purpose central processing units, microprocessors, application specific processors, and logic devices, as well as any other type of processing device. In some examples, processing system 601 includes physically distributed processing devices, such as cloud computing systems.

Communication interface 610 includes one or more network interfaces for communicating over communication networks, such as packet networks, the Internet, and the like. The network interfaces can include one or more local or wide area network communication interfaces which can communicate over Ethernet or Internet protocol (IP) links. Communication interface 610 can include network interfaces configured to communicate using one or more network addresses, which can be associated with different network links to different communication service providers. Examples of communication interface 610 include network interface card equipment, transceivers, modems, and other communication circuitry. Communication interface 610 is associated with at least network addresses 615-616 for sending and receiving data over a network. Network addresses 615-616 can be IP addresses.

RAM 630 and storage 640 together can comprise a data storage system, such as in data storage system 641 for storage of cached content 642, although variations are possible. RAM 630 and storage 640 can each comprise any non-transitory storage media readable by processing system 601 and capable of storing software. RAM 630 can include volatile and nonvolatile, removable and non-removable media implemented in any method or technology for storage of information, such as computer readable instructions, data structures, program modules, or other data. Storage 640 can include non-volatile storage media, such as solid state storage media, flash memory, or solid state storage system. RAM 630 and storage 640 can each be implemented as a single storage device but can also be implemented across multiple storage devices or sub-systems. RAM 630 and storage 640 can each comprise additional elements, such as controllers, capable of communicating with processing system 601.

Software stored on or in RAM 630 or storage 640 can comprise computer program instructions, firmware, or some other form of machine-readable processing instructions having processes that when executed by processing system 601 direct content node 600 to operate as described herein. For example, software drives content node 600 to receive requests for content, determine if the content is stored in content node 600, retrieve content from origin servers, transfer content to end user devices, and manage data storage systems for handling and storing the content, among other operations. The software can also include user software applications. The software can be implemented as a single application or as multiple applications. In general, the software can, when loaded into processing system 601 and executed, transform processing system 601 from a general-purpose device into a special-purpose device customized as described herein.

Figure 7:
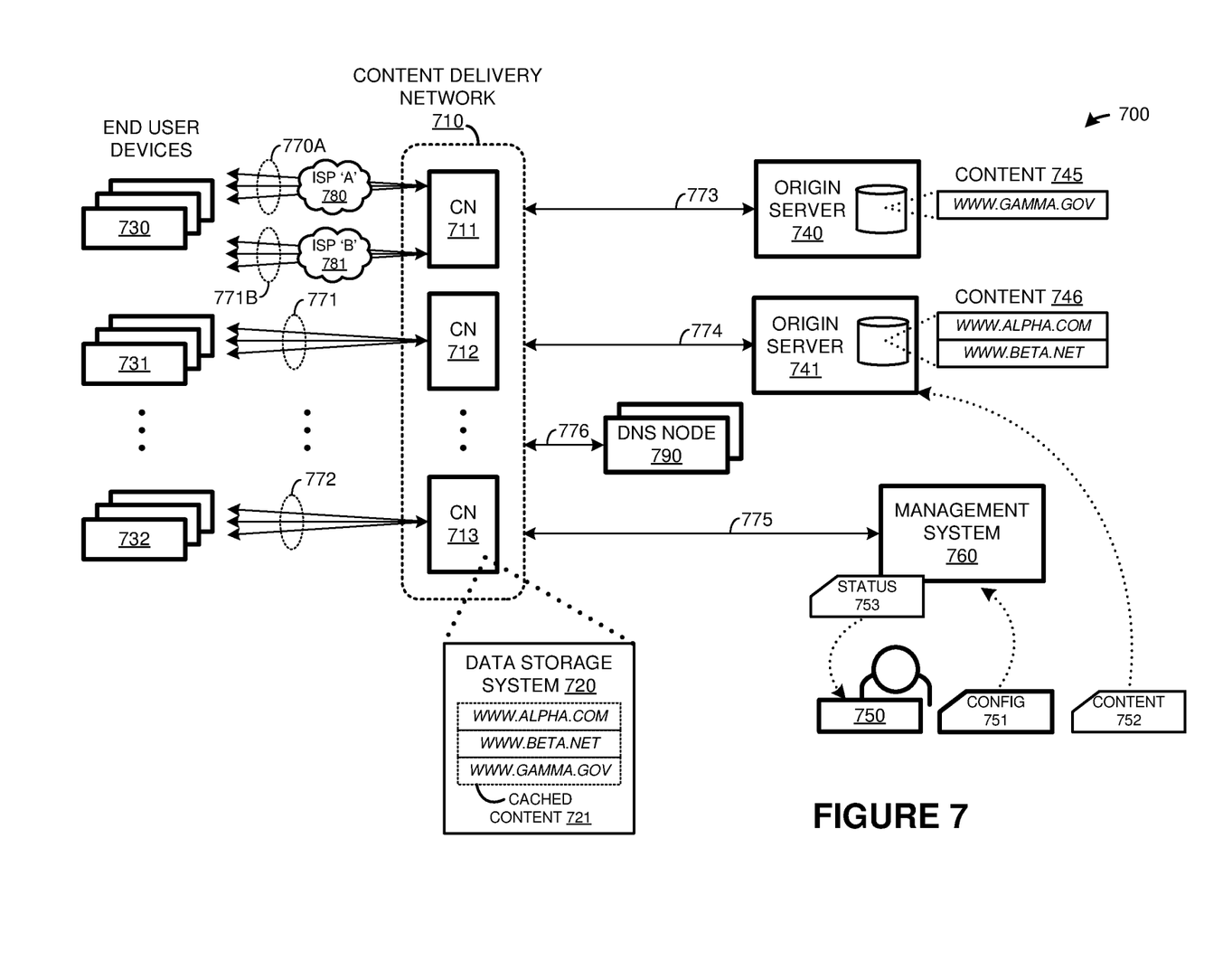
FIG. 7 is a system diagram illustrating a communication system.

As an example employing multiple content nodes in a content delivery network, FIG. 7 is presented. FIG. 7 can include one or more of content node 120 of FIG. 1, which can handle content requests from various end user devices, such as end user device 130. FIG. 7 is a system diagram illustrating communication system 700. Communication system 700 includes content delivery network 710, end user devices 730-732, origin servers 740-741, management system 760, Internet Service Providers (ISP) 780-781, and DNS node 790. Content delivery network 710 includes one or more content nodes (CN) 711-713. Each of CN 711-713 can include one or more data storage systems, such as that illustrated for CN 713 as data storage system 720. Data storage system 720 can be an example of content data storage 641 of FIG. 6. End user devices 730-732 are representative of a plurality of end user devices, which can request and receive network content, and any number of end user devices 730-732 can be associated with each of content nodes 711-713. CN 711-713 and ones of end users 730-732 communicate over associated network links 770-772. Content delivery network 710 and origin servers 740-741 communicate over associated network links 773-774. Content delivery network 710 and management system 760 communicate over link 775. DNS node 790 and at least content delivery network 710 communicate over link 776. Although not shown in FIG. 7 for clarity, each of CN 711-713 can also communicate with each other over network links.

To further illustrate FIG. 7, a brief description of the operation of communication system 700 is included. In operation, end user devices 730-732 request network content, such as content 745-746 associated with origin servers 740-741. Instead of these requests being handled by the individual origin servers 740-741, individual content nodes 711-713 of content delivery network 710 receive the content requests over ones of links 770-772 and process the content requests for delivery of the content to the associated end user devices 730-732. Requested network content that is already stored in ones of CN 711-713 can be provided quickly to the end user devices, while network content that is not already stored in ones of CN 711-713 can be responsively requested by an associated one of CN 711-713 from an appropriate origin server 740-741 for delivery by the CN and possible caching by the CN. In this manner, each of CN 711-713 can act as intermediary proxy nodes to provide local and fast access for end user devices 730-732 to network content of origin servers 740-741 without burdening origin servers 740-741. FIG. 7 shows cached content 721 included in data storage system 720 of CN 713 as comprised of content 745-746, and thus content 745-746 is currently shown as cached by CN 713. Other configurations are possible, including subsets of content 745-746 being cached in individual ones of CN 711-713.

Although FIG. 7 shows content 745-746 of origin servers 740-741 being cached by data storage system 720, CN 711-713 can handle other content. For example, dynamic content generated by activities of end user devices 730-732 need not originally reside on origin servers 740-741, and can be generated due to scripting or code included in web page content delivered by CN 711-713. This dynamic content can also be cached by ones of CN 711-713, and can be specific to a particular end user device during a communication session.

In the present example of system 700, CNs 711-713 are configured to deliver content that is cached on behalf of one or more origin servers. Each of CNs 711-713 can have one or more network addresses associated therewith which can interface with an associated communication service provider, such as an Internet Service Provider. As a specific example, CN 711 has two network addresses (not shown for clarity in FIG. 7) associated therewith. A first network address is associated with ISP 'A' 780 and a second network address is associated with ISP 'B' 781. The network addresses can be Internet Protocol (IP) addresses, or can include other network addresses, such as Ethernet addresses, ATM node identifiers, and the like. When an end user device, such as end user device 730, desires to retrieve content associated with a domain name, such as during web browsing and clicking a hyperlink, a query is issued to a domain name lookup service. This domain name lookup service translates a domain name, and possibly other path information, into a network address that is resolvable by network routing systems to reach a destination. In this example, the domain name query is transferred to DNS node 790 which translates a domain name included in the domain name query into a network address. If the domain name is associated with content cached by CN 711, for example, then a network address of CN 711 is identified by DNS node 790 and responsively transferred for delivery to end user device 730. However, in this example, CN 711 has at least two network addresses associated therewith, and each network address is associated with a different ISP. DNS node 790, or another control node such as that described herein, can identify and process network performance characteristics to select a desired network address for CN 711. This selected network address can be associated with any of ISP 780-781 and when a content request is issued by end user device 730 using the selected network address, the content request will propagate/route over the associated ISP to reach CN 711.

Referring back to the elements of FIG. 7, CN 711-713, origin servers 740-741, management system 760, and DNS node 790 can each include communication interfaces, network interfaces, processing systems, computer systems, microprocessors, storage systems, storage media, or some other processing devices or software systems, and can be distributed among multiple devices. Examples of CN 711-713, origin servers 740-741, management system 760, and DNS node 790 can each include software such as an operating system, logs, databases, utilities, drivers, caching software, networking software, and other software stored on a computer-readable medium. Content delivery network 710, in addition to including CN 711-713, can include equipment and links to route communications between CN 711-713 and any of end user devices 730-732, origin servers 740-741, management system 760, ISPs 780-781, and DNS node 790, among other operations. Although one DNS node 790 is shown in FIG. 7, more than one DNS node can be employed, such as geographically distributed DNS nodes, or a hierarchical DNS node architecture with primary DNS nodes and secondary or private DNS nodes.

End user devices 730-732 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Management system 760 handles configuration changes and status information for system operators and for the origin server operators or managers. For example, administrator 750 can use management system 760 to transfer configuration 751 to content delivery network 710. Configuration 751 may alter the handling of network content requests by CN 711-713, may purge content from CN 711-713, or may provide other configuration information. Also, management system 760 can monitor status information for the operation of end user devices, ISPs 780-781, and CN 711-713, such as operational statistics and network performance information, and provide this status information as 753 to administrator 750, or to a control node such as DNS node 790. Although one management system is illustrated in the present example, it should be understood that any number of management systems may be employed.

ISPs 780-781 each comprise one or more packet networks, routers, switches, bridges, links, and other packet network handling equipment and systems. ISPs 780-781 can each be operated by different service providers, and can include local and long-haul communication systems.

Communication links 770-776 each use metal, glass, optical, air, space, or some other material as the transport media. Communication links 770-776 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 770-776 can each be a direct link or can include intermediate networks, systems, or devices, and can include a logical network link transported over multiple physical links. Although one main link for each of links 770-776 is shown in FIG. 7, it should be understood that links 770-776 are merely illustrative to show communication modes or access pathways. In other examples, further links can be shown, with portions of the further links shared and used for different communication sessions or different content types, among other configurations. Communication links 770-776 can each include many different signals sharing the same associated link, as represented by the associated lines in FIG. 7, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An apparatus comprising:
   a domain name system (DNS) server configured to:
      receive a lookup request from an endpoint for access to content hosted by a content delivery network and stored by a cache server, wherein multiple internet protocol (IP) addresses are assigned to the cache server;
      identify a source IP address from which the lookup request originates;
      determine relative performance of a plurality of paths from the source IP address to the multiple IP addresses based on dynamic communication status data;
      in response to the lookup request, select which of the multiple IP addresses to use based on the relative performance of the plurality of paths; and
      direct the endpoint to connect to the cache server via the selected IP address from the multiple IP addresses.

2. The apparatus of claim 1 comprising the DNS server further configured to:
   identify the source IP address as part of a range of source IP addresses, from a plurality of ranges of source IP addresses; and
   determine the plurality of paths based on the range of source IP addresses associated with the lookup request and the multiple IP addresses assigned to the cache server.

3. The apparatus of claim 2 comprising the DNS server further configured to:
   receive network performance reports from a plurality of devices from the range of source IP addresses; and
   determine the dynamic communication status data based on the network performance reports.

4. The apparatus of claim 1 comprising the DNS server further configured to receive the lookup request from the endpoint via another DNS server.

5. The apparatus of claim 1 comprising the DNS server further configured to:
   receive a second lookup request from the endpoint for access to content stored at the cache server;
   in response to the second lookup request, select a different IP address from the multiple IP addressed to use based on the relative performance of the plurality of paths and new dynamic communication data; and
   direct the endpoint to connect to the cache server via the different IP address.

6. The apparatus of claim 1, wherein:
   each path of the plurality of paths includes a different communications service provider; and
   the relative performance of the plurality of paths is determined based on network status details for a corresponding communications service provider.

7. The apparatus of claim 6 comprising the DNS server further configured to:
   receive network performance reports from communication service providers comprising the plurality of paths; and
   determine the dynamic communication status data based on the network performance reports.

8. The apparatus of claim 1 comprising the DNS server further configured to:
   receive a network performance measurement from the endpoint; and
   determine the dynamic communication status data based on the network performance measurement.

9. The apparatus of claim 1 comprising the DNS server further configured to:
   receive one or more network performance reports from the cache server based on network performance measurements associated with the multiple IP addresses; and
   determine the dynamic communication status data based on the one or more network performance reports.

10. A method comprising:
    in a domain name system (DNS) server:
       receiving a lookup request from an endpoint for access to content hosted by a content delivery network and stored by a cache server, wherein multiple internet protocol (IP) addresses are assigned to the cache server;
       identifying a source IP address from which the lookup request originates;
       determining relative performance of a plurality of paths from the source IP address to the multiple IP addresses based on dynamic communication status data;
       in response to the lookup request, identifying a selected IP address from the multiple IP addresses to use based on the relative performance of the plurality of paths; and directing the endpoint to connect to the cache server via the selected IP address from the multiple IP addresses.

11. The method of claim 10 further comprising:
in the cache server:
receiving a content request from the endpoint via the selected IP address;
in response to the content request, providing the content to the endpoint;
providing a network performance measurement to the DNS server; and
in the DNS server, updating the dynamic communication status data based on the network performance measurement.

12. The method of claim 10 further comprising, in the DNS server:
identifying the source IP address as part of a range of source IP addresses, from a plurality of ranges of source IP addresses;
determining the plurality of paths based on the range of source IP addresses associated with the lookup request and the multiple IP addresses assigned to the cache server; and
identifying the selected IP address further based on the range of source IP addresses and a lookup table.

13. The method of claim 10 further comprising, in the DNS server:
receiving a second lookup request from the endpoint for access to content stored at the cache server;
in response to the second lookup request, selecting a different IP address from the multiple IP addressed to use based on changes to the relative performance of the plurality of paths based on new dynamic communication data; and
directing the endpoint to connect to the cache server via the different IP address.

14. The method of claim 10, wherein:
each path of the plurality of paths includes a different communications service provider;
the method further comprising, in the DNS server:
determining the relative performance of the plurality of paths based on network status details for a corresponding communications service provider, including:
receiving network performance reports from communication service providers comprising the plurality of paths; and
determining the dynamic communication status data based on the network performance reports.

15. The method of claim 10 further comprising, in the DNS server:
receiving a network performance measurement from the endpoint; and
determining the dynamic communication status data based on the network performance measurement.

16. The method of claim 10 further comprising, in the DNS server:
receiving a network performance report from the cache server based on network performance measurements associated with the multiple IP addresses; and
determining the dynamic communication status data based on the network performance report.

17. A memory device storing instructions that, when executed, cause a processor to perform a method comprising:
receiving, at a domain name system (DNS) server, a lookup request from an endpoint for access to content hosted by a content delivery network and stored by a cache server, wherein multiple internet protocol (IP) addresses are assigned to the cache server;
identifying a source IP address from which the lookup request originates;
determining relative performance of a plurality of paths from the source IP address to the multiple IP addresses based on dynamic communication status data;
in response to the lookup request, identifying a selected IP address from the multiple IP addresses to use based on the relative performance of the plurality of paths; and
directing the endpoint to connect to the cache server via the selected IP address from the multiple IP addresses.

18. The memory device of claim 17 storing instructions that, when executed, cause the processor to perform the method further comprising:
determining the relative performance of the plurality of paths based on network status details for a corresponding communications service provider, wherein each path of the plurality of paths includes a different communications service provider, including:
receiving network performance reports from communication service providers comprising the plurality of paths; and
determining the dynamic communication status data based on the network performance reports.

19. The memory device of claim 18 storing instructions that, when executed, cause the processor to perform the method further comprising:
receiving a network performance measurement from the endpoint; and
determining the dynamic communication status data further based on the network performance measurement.

20. The memory device of claim 19 storing instructions that, when executed, cause the processor to perform the method further comprising:
receiving additional network performance measurements from the cache server based on network performance measurements associated with the multiple IP addresses; and
determining the dynamic communication status data further based on the additional network performance measurements.

* * * * *